(12) United States Patent
Sauter et al.

(10) Patent No.: US 6,186,284 B1
(45) Date of Patent: Feb. 13, 2001

(54) FLUID PARKING BRAKE FOR A RAIL VEHICLE AIR BRAKE CYLINDER

(75) Inventors: Jeffrey F. Sauter, Lowville; Gayle J. Thelen, Orchard Park, both of NY (US)

(73) Assignee: New York Air Brake Corp., Watertown, NY (US)

( * ) Notice: Under 35 U.S.C. 154(b), the term of this patent shall be extended for 0 days.

(21) Appl. No.: 09/154,706

(22) Filed: Sep. 17, 1998

(51) Int. Cl.⁷ .................................................. B61H 13/00
(52) U.S. Cl. .......................................... 188/33; 188/196 R
(58) Field of Search ........................... 188/33, 52, 53, 188/54, 196 R, 196 D, 196 P, 197, 198, 199, 202, 203, 207, 217, 219.1, 220.1

(56) References Cited

U.S. PATENT DOCUMENTS

| | | |
|---|---|---|
| 719,148 | 1/1903 | Shelton . |
| 3,177,984 | 4/1965 | Taylor . |
| 3,378,108 | 4/1968 | McClure et al. . |
| 3,651,457 | 3/1972 | Sprouse . |
| 3,731,766 | 5/1973 | Campbell . |
| 3,891,277 | 6/1975 | Cope . |
| 4,019,426 | 4/1977 | Wosegien et al. . |
| 4,368,927 | 1/1983 | Billingsley et al. . |
| 4,368,928 | 1/1983 | Billingsley et al. . |
| 4,653,812 | 3/1987 | Engle . |
| 4,716,995 | 1/1988 | Nilsson et al. . |
| 4,766,980 | 8/1988 | Engle . |
| 4,771,868 | 9/1988 | Haydu . |
| 4,978,178 | 12/1990 | Engle . |
| 5,031,731 | 7/1991 | McKay . |
| 5,069,312 | 12/1991 | Kanjo et al. . |
| 5,203,616 | 4/1993 | Johnson . |
| 5,400,874 * | 3/1995 | Gayfer .................................. 188/52 |
| 5,495,921 | 3/1996 | Samulak et al. . |
| 5,558,410 * | 9/1996 | Kanijo .................................. 303/71 |
| 5,701,975 | 12/1997 | Hawryszkow . |
| 5,738,416 | 4/1998 | Kanjo et al. . |
| 5,791,739 | 8/1998 | Ring et al. . |
| 5,848,550 | 12/1998 | Cathcart et al. . |

\* cited by examiner

*Primary Examiner*—Matthew C. Graham
*Assistant Examiner*—C. T. Bartz
(74) *Attorney, Agent, or Firm*—Barnes & Thornburg

(57) ABSTRACT

A fluid parking brake for a rail vehicle having a brake cylinder with a first piston responsive to fluid signals to apply and release the brakes on the vehicle. The parking brake includes a housing having a second piston in the housing and which is coupled to the first piston. An apply port in the housing receives a pressure signal to move the second piston to an apply position. A detent is provided for provided for holding the second piston in the applied position.

27 Claims, 5 Drawing Sheets

FLUID PARKING BRAKE FOR A RAIL VEHICLE AIR BRAKE CYLINDER

BACKGROUND AND SUMMARY OF THE INVENTION

The present invention relates generally to rail vehicle air brakes and more specifically, to a fluid operated parking brake therefore.

The brakes for railroad vehicles are pneumatic operated brakes, or air brakes which include a brake cylinder to operate the brake shoes to engage the wheel and brake the car. The brake cylinder receives a pneumatic signal to apply the brakes and generally has a spring return. Other brake cylinders may be spring applied and air released. Most railroad cars also include a parking or hand brake, which is a manually operated device which applies the brake manually. For truck mounted brake riggings, the hand brake is generally applied to the output of the brake cylinder and more specifically to the levers which connect the brake cylinder to the brake beams. A typical example is shown in U.S. Pat. No. 5,069,312. Chains are generally connected to the levers and to a convenient place on the car to allow the manual application of the parking brake. Another example of a truck mounted brake includes brake cables which are actuated manually and remotely and are connected to the piston of the brake cylinder to manually operate the brake cylinder. A typical example is shown in U.S. Pat. No. 4,653,812 and similarly illustrated in FIGS. 1 and 2 to be assessed below. Another mechanical system for a hand brake at the output of the brake cylinder is illustrated in U.S. Pat. No. 4,019,426.

The integration of the air brake control of the brake cylinder and a manual, pneumatic and/or electropneumatic controlled parking brake is illustrated in U.S. Pat. No. 5,738,416. In one embodiment illustrated in FIGS. 7 and 8, the piston rod of the modified brake cylinder to include recess to receive a latching detent controlled by a piston rod of a latching cylinder. This mechanism latches the brake in the applied position and requires a release signal to remove the detent. Thus, in even normal braking conditions, the detent is actuated.

Manual pumps to actuate separate hydraulic parking brakes on railroad vehicles are illustrated in U.S. Pat. No. 5,701,975. The parking brakes are connected to the brake beams and are independent of the normal brake cylinder.

The present invention is a fluid parking brake for a rail vehicle having a brake cylinder with a first piston responsive to fluid signals to apply and release the brakes on the vehicle. The parking brake includes a housing having a second piston in the housing and which is coupled to the first piston. An apply port in the housing receives a pressure signal to move the second piston to an apply position. A detent is provided for holding the second piston in the applied position.

The detent may be responsive to removal of pressure at the applied port to hold the second piston in the applied position. Release of the detent allows the second piston to move to the release position. A release port may be provided in the housing for receiving a pressure signal to release the detent and allow the second piston to move to the release position. The detent may also be released by manual force on the detent. A lost motion device may be provided connecting the second piston to the first piston. This allows the first piston to move in an applied direction without moving the second piston in its applied direction.

The detent may include at least one recess on the second piston and a dog to be received in the recess to hold the second piston in the applied position. A lock on the detent is responsive to the removal of pressure at the applied port to lock the dog in the recess. The lock includes a third piston having a cam recess and the dog rides in the cam recess. The third piston is responsible to the removal of pressure at the applied port to lock the dog in the recess and is responsive to pressure at the release port to unlock the dog and allow the second piston to move to the release position.

The housing of the parking brake may be cylindrical and mounted to the brake cylinder. A pair of parking brakes may be provided with their second pistons connected to the first piston symmetrical with respect to the axis of travel of the first piston. The brake cylinder may include an integral slack adjuster. A manually operated pump is connected fluidically to the applied port and may be a hydraulic pump with automatic depressurization.

The brake cylinder and the first piston have openings for receiving cables of a hand brake. The second piston is connected to the first piston via these openings. Thus, a method for retrofitting a cable operated parking brake for a rail brake cylinder using a fluidly operated parking brake would include connecting the second piston of the parking brake via the openings in the first housing and the first piston which receive the parking brake cable. Preferably, this includes connecting the second piston to the first piston by a lost motion device.

Other objects, advantages and novel features of the present invention will become apparent from the following detailed description of the invention when considered in conjunction with the accompanying drawings.

DETAILED DESCRIPTION OF THE PREFERRED EMBODIMENTS

Figure 1:
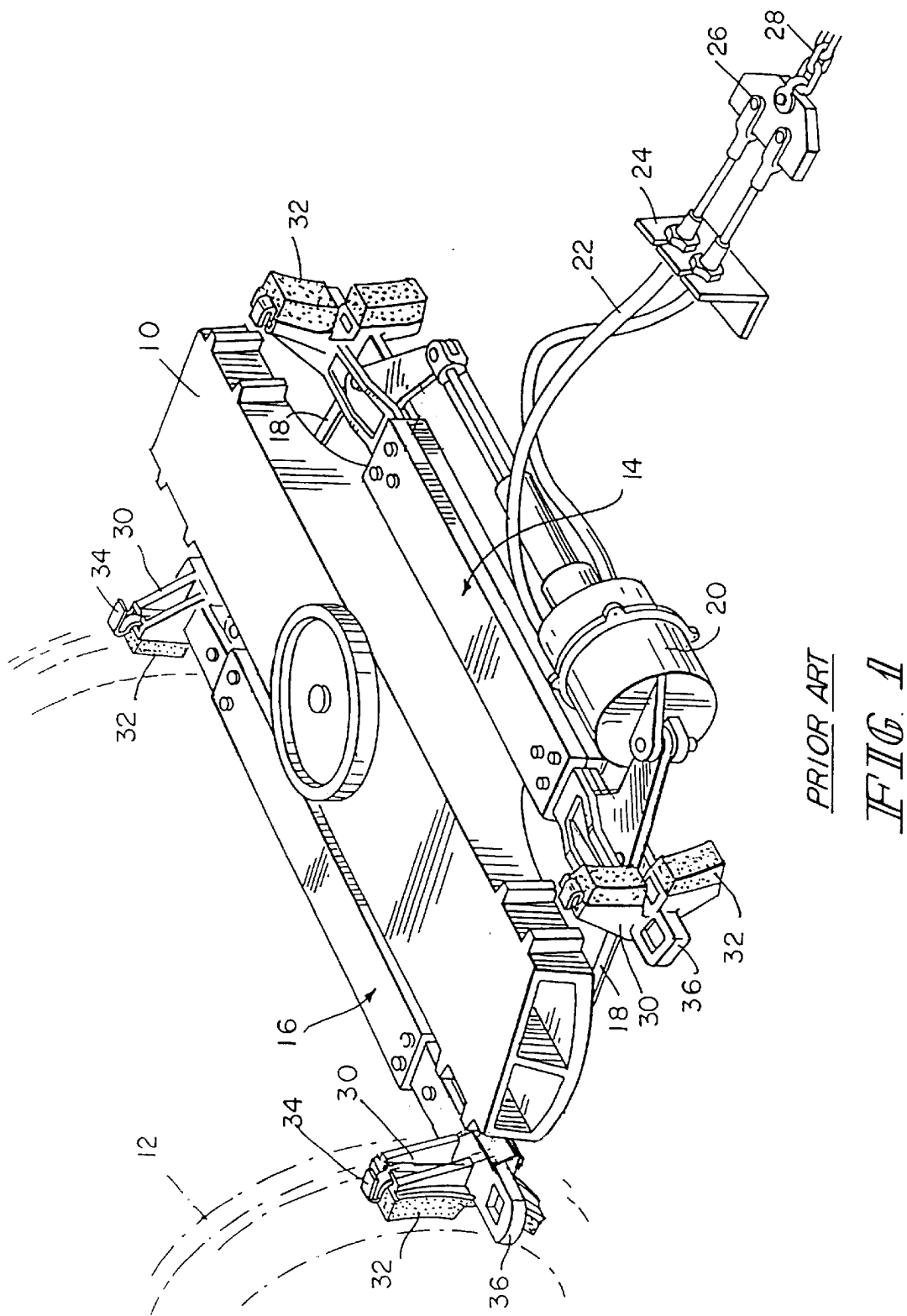
FIG. 1 is a perspective view of a truck mounted brake mounted to the truck incorporating the principles of the present invention.

A truck mounted brake is shown in FIG. 1 with respect to bolster 10 of the truck and a wheel 12. The illustration is for a double axle truck and therefore will be described with respect to two brake beams. It should be noted that the system may also be used with a single axle and therefore a single brake beam.

Figure 2:
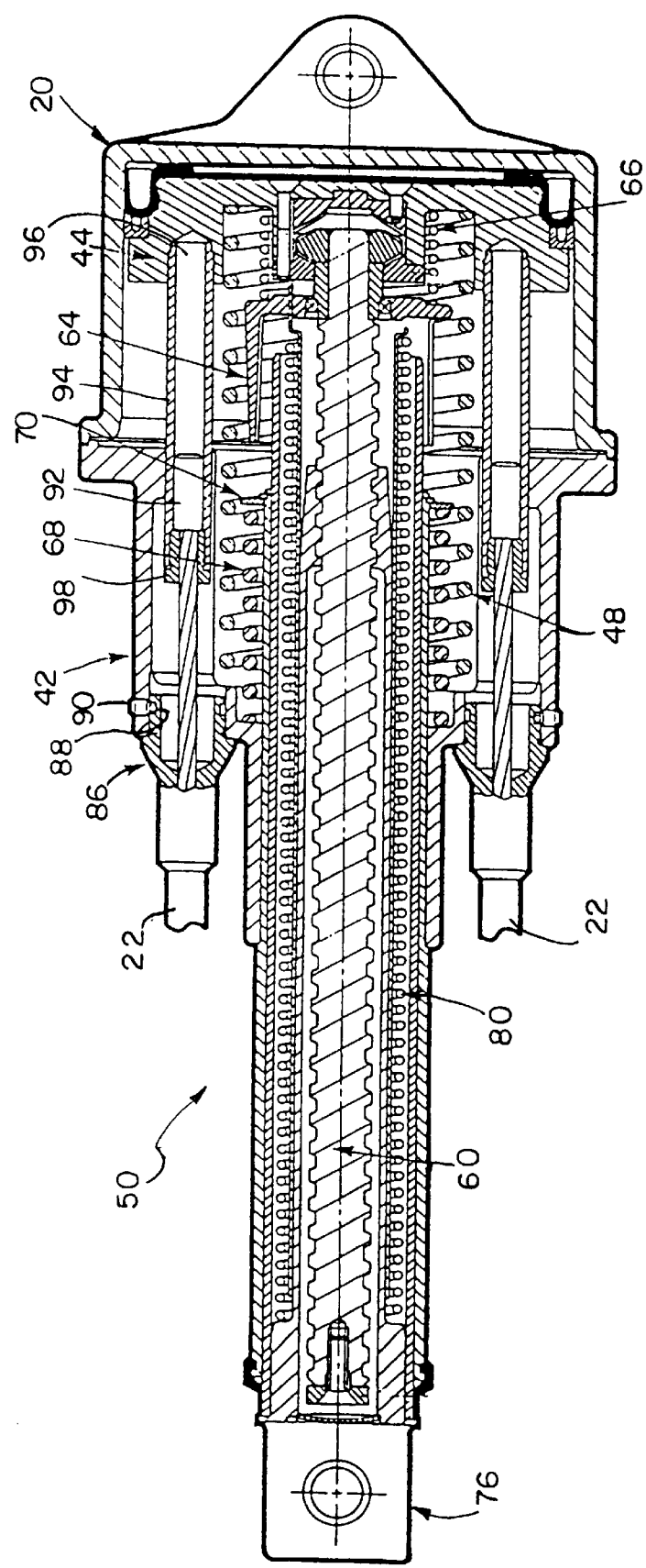
FIG. 2 is a cross sectional view of the brake cylinder actuator with slack adjuster of the prior art of FIG. 1.

The truck mounted brake illustrated in FIGS. 1 and 2 include a primary brake beam 14 and a secondary brake beam 16 on opposite sides of the bolster 10 and interconnected by force transmission or push rod assembly 18. An actuator 20 is supported by the primary beam 14 and is connected to the secondary beam 16 by the push rods 18. A hand brake cable 22 is connected to the actuator 20 and to cable reaction bracket 24, equalization plate 26 and chain 28.

At each end of the primary beam 14 and the secondary beam 16, is a brake head 30 having brake shoes 32 secured thereto by removable latch 34. Also, extending from the ends of each of the brake beams are guide feet 36 which are received in slots in the side walls of the truck. Each of the brake heads 30 and brake shoes 32 are adjacent to respective wheel 12, only one of which is illustrated.

Figure 4:
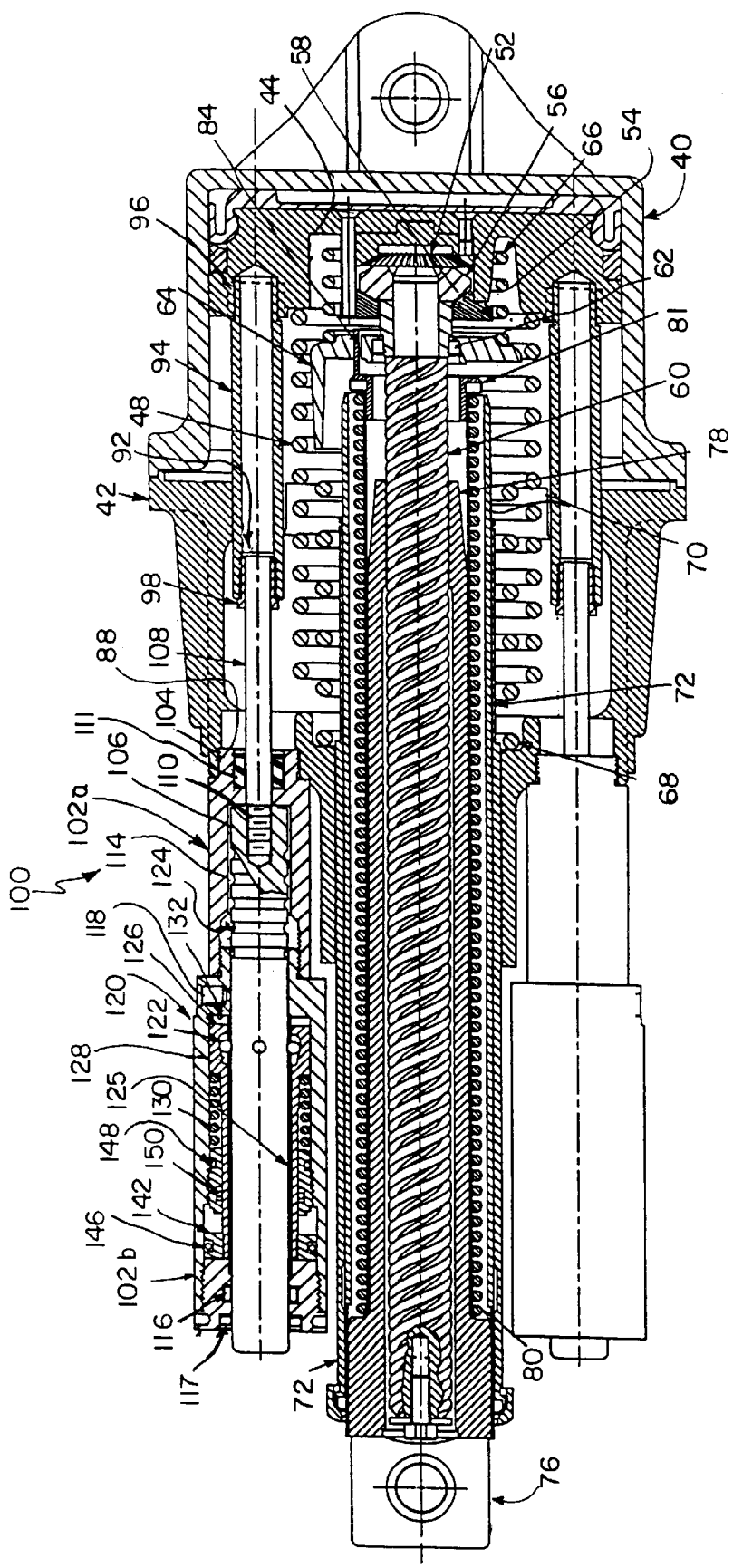
FIG. 4 is a partial cut-away of the brake actuator incorporating the present invention of FIG. 3.

As illustrated in FIGS. 2 and 4, the brake cylinder actuator 20 includes a body 40 and non-pressure head 42 to form a housing. Piston 44 divides the interior of body 40 into a pressurized and unpressurized volumes. A port 46 admits the fluid pressure into the volume between the body 40 and the piston 44 to move the piston 44 to the left in brake applied position. Spring return 48 resting at one of its ends on the cylinder portion 42 and biases the piston 44 to the right or release position.

The cylinder slack adjuster portion 50 includes a back female clutch face 52 and a front female clutch face 54 both mounted to the piston 44 cooperating with a corresponding back head clutch face 56 and front head clutch face 58 both part of the compensator screw 60. A bearing 62 rotational mounts the screw 60 to a bearing cup 64. A cup spring 66 rests between the piston 44 and the bearing cup 64 and biases the front clutch faces 54, 56 into engagement to prevent rotation of the screw 60. A spring 68 rest between the actuator internal housing portion 42 and a ring 70 on sleeve 72.

A ram 76 is guided inside of sleeve 72 and is threadably connected to the compensation screw 60 at threads 78. A ram spring 80 extends between the ram 76 and a flange 81 on sleeve 82 which engages the piston by follower 84 extending through bearing cup 64 holes. Spring 80 pushes ram 76 leftward when screw 60 rotates during the excessive slack. The slack adjuster 50 is a double acting slack adjuster integral with the actuator 20 or brake cylinder.

A threaded sleeve 86 of the cable 22 is received in threaded opening 88 in the housing portion 42 and is secured thereto by fastener 90. One end of the cable 22 has a termination 92 received in sleeve 94 which is threadably connected to the piston 44 in threaded opening 96. A stop or plug 98 is threadably received in the end of the sleeve 96 and acts as a stop for the termination 92 of the cable 22. Thus, as the cable 22 moves to the left, it pulls the piston 42 to the left or in the applied position. When the parking brake cable 22 is released, the return spring 48 returns the piston 44 to the release position. The termination 92 of the cable 22 may ride freely in sleeve 94 and therefore there is a lost motion in the applied direction of the piston 44.

The system so far described is well known in the industry and is illustrated for example, in U.S. Pat. No. 5,495,921. The operation of the actuator 20, with or without slack adjusters, and the push rod assemblies 18 to operate the pair of brake beams 14 and 16 is well known and will not be described here in detail.

Also, it should be noted that the invention to be described is not to be limited to a specific brake cylinder with or without slack adjuster nor to a brake cylinder system on a truck mounted brake. The description of the invention with a slack adjuster on a truck mounted brake is an example only. The cylinder may be a cylinder on a car which is not truck mounted.

Figure 3:
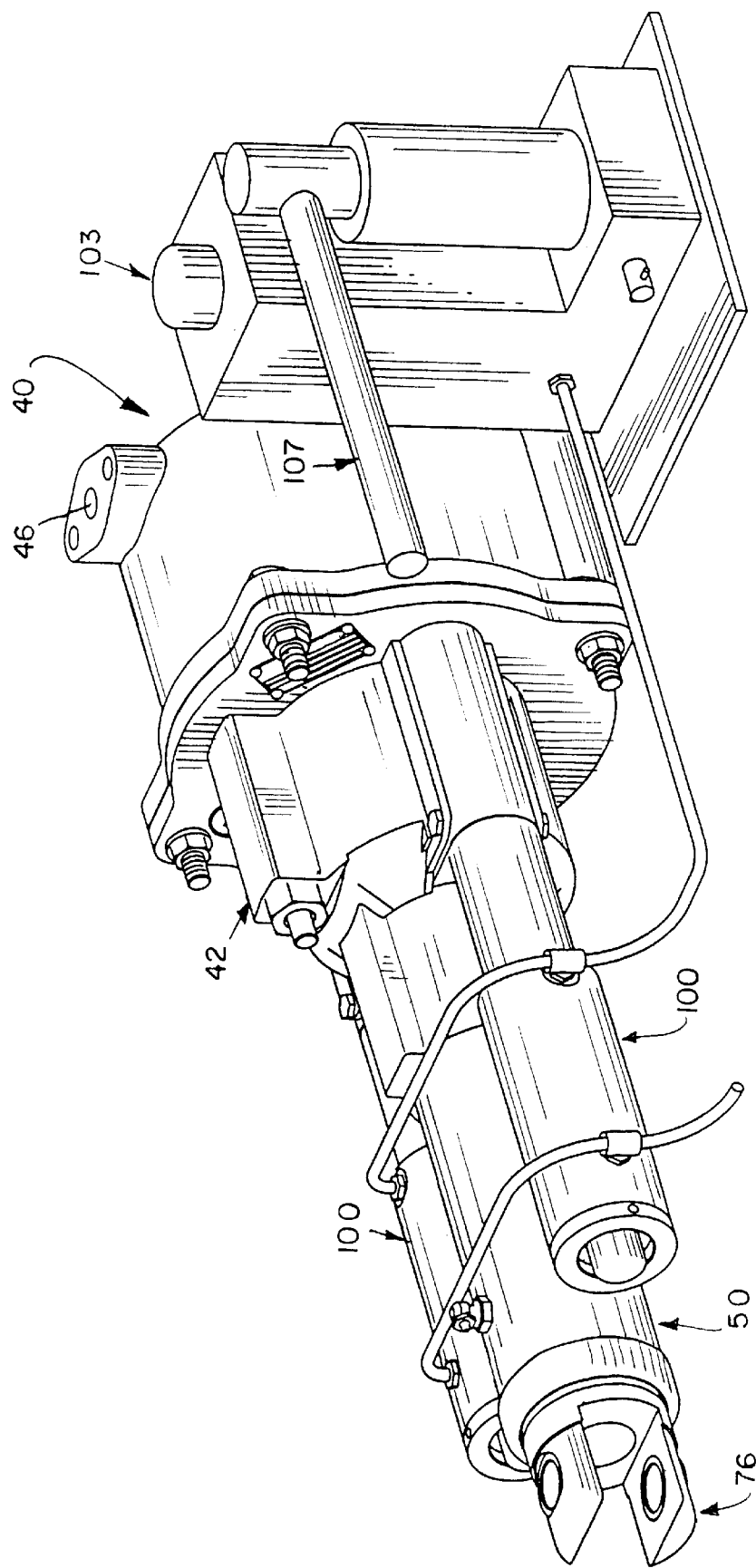
FIG. 3 is a perspective view of a brake actuator incorporating the parking brake of the present invention.

A fluid operated parking brake 100 is illustrated in FIG. 3 as including a pair of fluid actuators mounted to the housing portion 42 of the brake cylinder or actuator 20. Although two parking brakes 100 are shown for the brake actuator 20, a single parking brake 100 may be used with other brake actuators or brake cylinders. The parking brakes 100 are actuated by a fluid received on hoses 101 from a pump 103. Preferably, the hoses are steel armored hoses. The pump 103 includes an input or manually operated handle 107 which pump strokes the piston in the pump 103. Other inputs, for example, a push piston type may be used. The pump 103 may be mounted at any location on the rail car with various hose locations to support the preferred mounting location. The pump 103 holds the applied pressure and automatically depressurizes itself. The pump can depressurize itself, for example, within three to ten minutes depending upon the oil temperature. Pump 103 may be a hydraulic brake and be, for example, Model P2A-80 available from Star HYD Pump. This eliminates the need for a relief valve.

As will be explained with respect the details of FIGS. 4 and 5, the parking brake actuators 100 have a detent to lock in the applied position and therefore, pressurization is not needed to maintain the brakes.

In one embodiment of the fluid parking brake 100, the detent is released by a second fluid signal in hose 109. The hose 109 may be connected to a line running throughout the trains such that an engineer at the locomotive or at any of the locations, can release all of the parking brakes simultaneously when the cars are connected into the train. The signal may also be applied on a car-by-car basis at the glad hand which interconnects the pipes between the cars. Similarly, the fluid signal can be applied to hose 109 by any of the various schemes described in U.S. Pat. No. 5,738,416 for controlling the parking brake. As will be explained more fully below, the detent may also be overcome by manual force applied directly to the detent of the fluid actuator 100.

Since the detent is only operational after applying the parking brakes, a fluid pressure signal is not needed to keep the parking brake applied.

Figure 5:
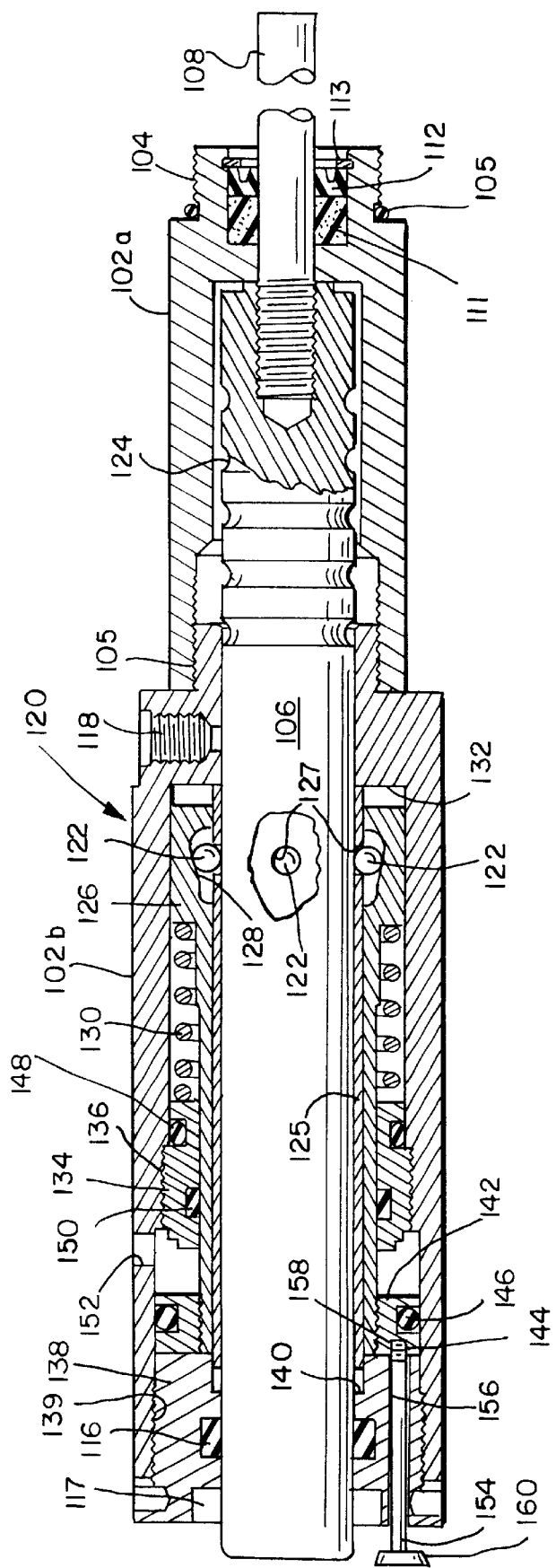
FIG. 5 is an enlarged view of the parking brake of FIG. 4.

As shown in FIGS. 4 and 5, the fluid parking brake 100 includes a housing 102 having a threaded end 104 to be received in threaded opening 88 in housing portion 42 of the brake cylinder 20. The housing 102 may be two pieces 102a and 102b threadably joined and including a gasket or O-ring 105. A gasket or O-ring 105 is provided between the housing 42 and 102. Fastener 90 secures the threaded connection, but may be eliminated. This is the same opening as received in the sleeve 86 of the cables 22 of FIGS. 1 and 2.

A piston 106 in housing 102 is connected to the piston 44 by connector 108 which is threadably received at 110 at the end of piston 106. The other end of connector 108 includes the termination 92 which is in sleeve 94. The stop 98 is provided at the end of sleeve 94. Termination 92, sleeve 94 and stop 98 may be the same connection to the piston as for cable 22. The connector 104 may be a rigid rod or also may be a piece of cable. As with the cable 22, the connection is a lost motion connection between the piston 106 and piston 44 in the applied direction of piston 44. This allows the piston 44 to be applied in a regular service or in an emergency brake condition without moving the piston 106 of the parking brake.

The connector 108 is slidably received in a gasket 111 and seal 112 held by stop ring 113. The piston 106 is in a chamber 114 of the housing 102 and is slidably received in a gasket 116 and seal-wiper 117 at the other end of the housing 102. An apply port 118 in the housing 102 receives the apply fluid signal from the hose 101 and preferably from the pump 103. This fluid pressure on the left end of the piston 106 moves it to the left pulling the piston 44 to apply the brakes.

A detent 120 is provided on the fluid parking brake which holds the piston 106 in its applied position. The detent 120 includes a dog, shown as balls, 122 which are received in recesses 124 on the piston 106. Where piston 106 is cylindrical, the recesses 124 are annular recesses. The detent 120 includes a lock including a slide 126 which has a cam recess 128 in which the balls or dogs 122 ride. A spring 130 between the slide 126 and stop 134 biases the slide 126 to the right towards stop or end wall 132 of the housing 102a against the pressure at the apply port 118. The slide 126 rides on sleeve 125 which includes openings 127 for the balls 122. The openings 127 prevents the balls 122 from moving along the motion axis of the slide 126 and piston 106. The slide 126 acts as a piston.

The stop 134 is threadably received at 136 to the interior of housing 102b and cap end 138 is threadably received at 139 in the open end of housing 102b. The gasket 116 and wiper seal 117 are in recesses in end cap 138. A shoulder 140 in end cap 138 secures the sleeve 125 within the housing 102b.

The slide 126 includes a slide ring or shoulder 142 threadably connected to an end thereof at 144. Ring 142 includes a seal 146. Stop 134 includes a gasket or O-ring 148 and a seal 150. A release port 152, connected to hose 109, is between the slide ring 142 of the slide 126 and the stop 132. Whereas the gasket 148 seals the fluid from apply port 118, the seals 146 and 150 seal the fluid signal from release port 152. Slide ring 142 moves between stop 134 and the end wall of end cap 138. Slide ring 142 also acts as a piston in response to the fluid signal at release port 152.

With no pressure at apply port 118, the spring 130 forces the slide 126 to the right towards the stop or end wall 132 of the housing 102. If no recess 124 is aligned with the ball 122 and opening 127, the slide 126 will lock and cannot reach the stop 132. If a recess 124 is aligned with the ball 122 and opening 127, the ball will move radially into the recess and the spring will move the slide substantially to the stop 132 and lock the ball 122 in recess 124. When pressure is applied at the apply port 118, it forces the slide 126 to the left with slide ring 142 engaging end cap 138 and balancing the force of the spring 130 such that the ball 122 rides or sits in the deepest part of the cam recess 128 as illustrated in FIG. 5. As the pressure forces the piston 106 to the left, the ball 122 will ride up and down in and out of the recesses 124.

Once the apply pressure at port 118 is removed, the spring 130 forces the slide 126 to the right. Once the ball 122 moves into a recess 124, the slide 126 moves right toward the stop 132 and the ball 122 is forced down into and is locked in an adjacent or next adjacent recess 124. This locks the piston 106 in an applied position and through the connector 108, the piston 44 in an applied position.

One method of overcoming the locked detent 120 is to apply a release pressure to release port 152. This would be received from hose 109. A fluid from release port 152 against slide ring 142 moves the slide 126 to the left away from the stop 132. This will allow the piston 106 to return to the right being pulled by piston 44 and as return spring 46. The ball would be in the largest part of the cam surface 128 and would move up and down as the recesses 124 move relative to the slide 126.

An alternative method of releasing the locked detent is to apply a mechanical force which would overcome the detent as shown in the bottom half of FIG. 5. An actuator 154 extends through a bore 156 in the end cap 138 and is threadably received at 158 into the slide ring 142. A mechanical force can be applied to actuator 154 by engaging the head 160 and pulling it to the left. This will pull the slide ring 142 and the slide 126 to the left into engagement with the interior surface of end cap 138. This will allow the ball 132 to be received in the large portion of cam surface 128 thereby unlocking the detent.

Thus, it can be seen that the detent 120 is responsive to the removal of pressure at the apply port to hold the second piston at the apply position, namely, to lock the dog 122 in the recess 124. Other detent structures may be used. Preferably, the detent is applied and locks once the apply pressure is removed.

Since the fluid parking brake is mounted to the housing portions of brake cylinder or actuator device 20 using the threaded openings 88 in the housing and threaded opening 96 in the piston which is used for the cable system, the ability to retrofit cable operated parking brakes is available. Pressure, for example, 10 psi, is applied to the piston 44 causing the piston 44 and sleeve 94 to move to opening 88. This exposes the stop 98 and allows access of a tool to remove stop 98, the sleeve 94 by a hand tool. The cable sleeve 94, cable termination 92, stop 98 and sleeve 86 can all be removed from the piston 44 and the housing portion 42. A new sleeve 94 with connector 108 having termination 92 and stop 98 are then received in the threaded opening 96 in piston 44. The other end of the connector 108 is connected to the thread opening 110 of piston 106 by a hand tool. The cylindrical housing 102 of the fluid parking brake is then threadably received in threaded opening 88 of brake cylinder housing portion 42 and locked thereto by fastener 90. The pressure on piston 44 is removed either after the cylinder housing 102 is connected to the brake cylinder housing 42, or just before. As with the cables, a pair of fluid parking brakes are mounted to the piston 44, symmetrical with respect to the applied axis of the piston 44.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. A parking brake for a rail vehicle having a brake cylinder with a first piston in the brake cylinder responsive to fluid signals to apply and release brakes on the vehicle, the parking brake comprises:
   a housing;
   a second piston in the housing and coupled to the first piston;
   an apply port in the housing for receiving a pressure signal to move the second piston to an apply position;
   a detent for holding the second piston in the applied position; and
   a release port in the housing for receiving a pressure signal to release the detent and allow the second piston to move to a release position.

2. A parking brake according to claim 1, wherein the housing is mounted to the brake cylinder.

3. A parking brake according to claim 1, wherein the second piston is coupled to the first piston by a lost motion device.

4. A parking brake according to claim 1, including a manually operated pump connected fluidically to the apply port.

5. A parking brake according to claim 4, wherein the pump is a hydraulic pump with automatic depressurization.

6. A parking brake according to claim 1, wherein the detent includes at least one recess on the second piston and a dog to be received in the recess to hold the second piston in the applied position.

7. A parking brake according to claim 6, wherein the detent includes a lock responsive to the removal of pressure at the apply port to lock the dog in the recess.

8. A parking brake according to claim 7, wherein the lock includes a third piston having a cam recess and the dog rides in the cam recess.

9. A parking brake according to claim 8, wherein the third piston is responsive to the removal of pressure at the apply port to lock the dog in the recess and responsive to pressure at the release port to unlock the dog and allow the second piston to move to the release position.

10. A parking brake according to claim 1, wherein the detent includes a lock responsive to the removal of pressure at the apply port to lock the detent to hold the second piston in the applied position and responsive to pressure at the release port to unlock the detent and allow the second piston to move to the release position.

11. A parking brake according to claim 10, wherein the lock includes a third piston having a cam recess and the detent includes a dog which rides in the cam recess and engages the second piston.

12. A parking brake according to claim 1, wherein the parking brake includes a pair of housings, second pistons, detents, apply ports and release ports; and the housings are mounted to the brake cylinder.

13. A parking brake according to claim 12, wherein the connection of the second pistons to the first piston is symmetrical with respect to a travel axis of the first piston.

14. A parking brake according to claim 12, wherein the housings are cylindrical.

15. A parking brake according to claim 1, wherein the brake cylinder includes an integral slack adjuster.

16. A parking brake according to claim 1, wherein the detent can also be released by manual force on the detent.

17. A parking brake according to claim 1, wherein the brake cylinder and the first piston have openings for receiving cables of a hand brake and the second piston is connected to the first piston via these openings.

18. A parking brake for a rail vehicle having a brake cylinder with a first piston in the brake cylinder responsive to fluid signals at a brake port to apply and release brakes on the vehicle, the parking brake comprises:

a housing;

a second piston in the housing and coupled to the first piston;

an apply port in the housing for receiving a pressure signal to move the second piston to an applied position; and a detent in the housing and responsive to the removal of pressure at the apply port to hold the second piston in the applied position, and release of the detent allowing the second piston to move to a release position.

19. A parking brake according to claim 18, wherein the detent can be released by manual force on the detent.

20. A parking brake according to claim 18, wherein the housing includes a release port for receiving a pressure signal to release the detent and allow the second piston to move to the release position.

21. A parking brake according to claim 20, wherein the detent includes a third piston responsive to the pressure signals and having a cam recess and includes a dog which rides in the cam recess and engages the second piston.

22. A parking brake according to claim 18, wherein the detent includes a third piston responsive to the pressure signal; and including an actuator connected to the third piston and extending external the housing to mechanically release the detent.

23. A parking brake according to claim 18, wherein the detent includes a third piston responsive to the pressure signal; and including spring biasing the detent in opposition to the pressure signal.

24. A parking brake for a rail vehicle having a brake cylinder with a first piston in the brake cylinder responsive to fluid signals at a brake port to apply and release brakes on the vehicle, the parking brake comprises:

a housing;

a second piston in the housing;

a lost motion device connecting the second piston to the first piston;

an apply port in the housing for receiving a pressure signal to move the second piston to an applied position; and a detent in the housing for holding the second piston in the applied position.

25. A parking brake according to claim 24, wherein the lost motion device allows the first piston to move in an applied direction without moving the second piston in its applied direction.

26. A method for retrofitting a cable operated parking brake of a rail brake cylinder with a fluid operated parking brake; the brake cylinder having a first housing, a first piston in the first housing, openings in the first housing and the first piston for receiving parking brake cable to be connected to the first piston; the fluid parking brake having a piston in a second housing responsive to an applied fluid signal to move to an applied position and a detent in the second housing for holding the second piston in the applied position, the method comprising:

connecting the second piston to the first piston via the openings in the first housing and first piston for receiving the parking brake cable; and connecting the second housing to the first housing.

27. The method according to claim 26, including connecting the second piston to the first piston with a lost motion device.

* * * * *